J. LOOSE.
GRINDING MACHINE.
APPLICATION FILED JULY 15, 1915.
1,201,318.
Patented Oct. 17, 1916.
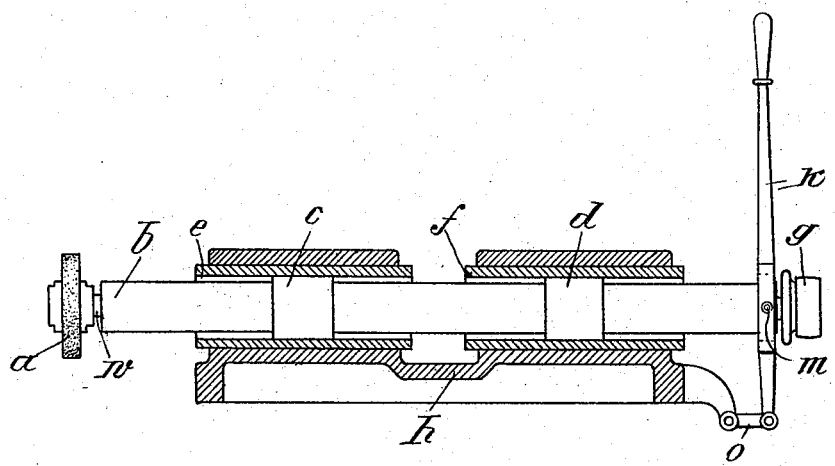
Inventor
Johannes Loose
By Knight Bro
his Attorney

UNITED STATES PATENT OFFICE.

JOHANNES LOOSE, OF STUTTGART-CANNSTATT, GERMANY, ASSIGNOR TO THE FIRM OF FORTUNA-WERKE, SPECIALMASCHINENFABRIK, G. M. B. H., OF STUTTGART-CANNSTATT, GERMANY.

GRINDING-MACHINE.

1,201,318.  Specification of Letters Patent.  Patented Oct. 17, 1916.

Application filed July 15, 1915.  Serial No. 40,019.

*To all whom it may concern:*

Be it known that I, JOHANNES LOOSE, of 31 Karlstrasse, Stuttgart-Cannstatt, in the Kingdom of Wurttemberg, German Empire, civil engineer, have invented certain new and useful Improvements in Grinding-Machines, of which the following is a specification.

My invention relates to grinding machines and more especially to the particular kind of grinding machines where the grinding wheel spindle located within a bearing is free to execute, apart from its rotative movement, a progressive movement in the direction of its axis.

The object of my invention is to render such machines especially suited for especially fine and accurate grinding work.

In the machines of this type which are in use at present, vibrations and shocks arise whenever the progressive movement is stopped or changed and the great masses in motion have to be stopped and started afresh. Further the bearing serving as a guide for the grinding wheel spindle during its progressive motion will alternately be nearer to or farther away from the grinding wheel, thus causing the grinding wheel spindle and its bearing to spring more or less, according to its position. According to the present invention these drawbacks are avoided by locating the grinding wheel spindle within a cylindrical bushing connected almost directly to the forward feeding or reversing device, thus making the reversed masses as small as possible, said cylindrical bushing being guided by aid of short guiding surfaces within a sleeve which is longer by at least the distance of the greatest axial displacement of the bushing, so that the distance between the grinding wheel and the spindle support is constant although the bushing is displaced within the bearing.

In the drawings affixed to this specification the preferred form of a grinding machine according to my invention is represented in longitudinal section.

$a$ is the grinding wheel, $w$ is the spindle provided with pulley $g$, $b$ is the cylindrical bushing surrounding the spindle, ball bearings being preferably inserted between the bushing and the spindle.

$c$ and $d$ are short cylindrical guide surfaces provided on the bushing and gliding within suitable guiding sleeves $e$ and $f$ of a head stock $h$.

For axially displacing the bushing $b$, a hand lever $k$ may be provided which is pivotally connected to the bushing $b$ at $m$ and at its lower end is connected to the head stock $h$ by means of the link $o$. Any other suitable means for displacing the bushing $b$ may be employed without going outside of my invention.

It is easy to see that while the bushing $b$ is being displaced within the guide sleeves $e$ and $f$, the distance from the guide surface $c$ to the grinding wheel will remain constant, so that the elastic yielding of the wheel caused by the grinding pressure will remain equal all through the displacing movement.

It is not imperative to make the guide surfaces of the bushing cylindrical; they might as well be prismatic. The manner in which the spindle is carried within the bushing is equally unimportant and may be altered to suit different working conditions.

I claim:—

In a grinding machine, in combination, a grinding wheel spindle, a bushing inclosing said spindle, means for axially displacing said bushing, guiding surfaces on said bushing, and guiding sleeves for said guiding surfaces, said guiding sleeves being at least as long as the greatest displacement of the said bushing, whereby the length of the unsupported portion of the said bushing beyond the outermost guiding surface is not varied by displacing the said bushing.

In testimony whereof, I affix my signature, in presence of two witnesses.

JOHANNES LOOSE.

Witnesses:
  ROSA THALBAUER,
  EUGEN SCHLEICHER.

Copies of this patent may be obtained for five cents each, by addressing the "Commissioner of Patents, Washington, D. C."